United States Patent
Donthireddy

(10) Patent No.: US 12,212,470 B2
(45) Date of Patent: Jan. 28, 2025

(54) TELECOMMUNICATIONS NETWORK USAGE ANOMALY DETECTION WITH SIMULATED USER INTERACTIONS SYSTEMS AND METHODS

(71) Applicant: T-Mobile USA, Inc., Bellevue, WA (US)

(72) Inventor: Venkata Reddy Donthireddy, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 342 days.

(21) Appl. No.: 17/861,061

(22) Filed: Jul. 8, 2022

(65) Prior Publication Data

US 2024/0015076 A1 Jan. 11, 2024

(51) Int. Cl.
*H04L 41/147* (2022.01)
*H04L 41/16* (2022.01)
*H04W 12/12* (2021.01)
*H04W 24/08* (2009.01)

(52) U.S. Cl.
CPC ............ *H04L 41/147* (2013.01); *H04L 41/16* (2013.01); *H04W 12/12* (2013.01); *H04W 24/08* (2013.01)

(58) Field of Classification Search
CPC ..... H04L 41/14; H04L 41/142; H04L 41/148; H04L 41/147; H04L 41/16; H04L 41/18; H04L 41/50; H04L 43/55; H04W 12/12; H04W 24/08
See application file for complete search history.

(56) References Cited

U.S. PATENT DOCUMENTS

| | | | |
|---|---|---|---|
| 11,831,644 B1 * | 11/2023 | Thakore | G06F 16/2455 |
| 2022/0207136 A1 * | 6/2022 | Grebennikov | G06F 21/554 |
| 2022/0309387 A1 * | 9/2022 | Rodriguez | H04L 9/3213 |
| 2023/0186075 A1 * | 6/2023 | Dutta | G06N 3/045 706/15 |
| 2024/0004962 A1 * | 1/2024 | Vakada | G06F 9/542 |

* cited by examiner

*Primary Examiner* — Siu M Lee
(74) *Attorney, Agent, or Firm* — Perkins Coie LLP

(57) ABSTRACT

Systems and methods for using a user simulation model to facilitate detection of usage anomalies is disclosed. Usage data is received for a session between a user device and an application or service. The usage data is monitored to detect a usage anomaly, such as unusual or suspicious transactions, unexpected user or device attributes, or abnormal usage patterns. In response to detecting a request to terminate the session, the session is instead handed off to a user simulation model that simulates interactions of a user in the session. The user simulation model can be a machine learning model that is trained, using a training dataset, to simulate user interactions. When the user logs into the application or service, the session can be handed off from the user simulation model to the user, such that the session is perpetual or substantially perpetual.

8 Claims, 5 Drawing Sheets

TELECOMMUNICATIONS NETWORK USAGE ANOMALY DETECTION WITH SIMULATED USER INTERACTIONS SYSTEMS AND METHODS

BACKGROUND

Entities and organizations monitor network and/or software usage (e.g., for websites, applications, services, etc.) for many purposes, including detection of anomalies. An anomaly can be, for example, one or more events, items, or observations that are suspicious because they differ from ordinary and/or expected behaviors or patterns. Traditional systems typically use thresholds to detect anomalies in usage data. An anomaly can be indicative of an error or failure, an outage, an attack or hack, and/or another adverse event or occurrence.

BRIEF DESCRIPTION OF THE DRAWINGS

Detailed descriptions of implementations of the present invention will be described and explained through the use of the accompanying drawings.

Figure 1:
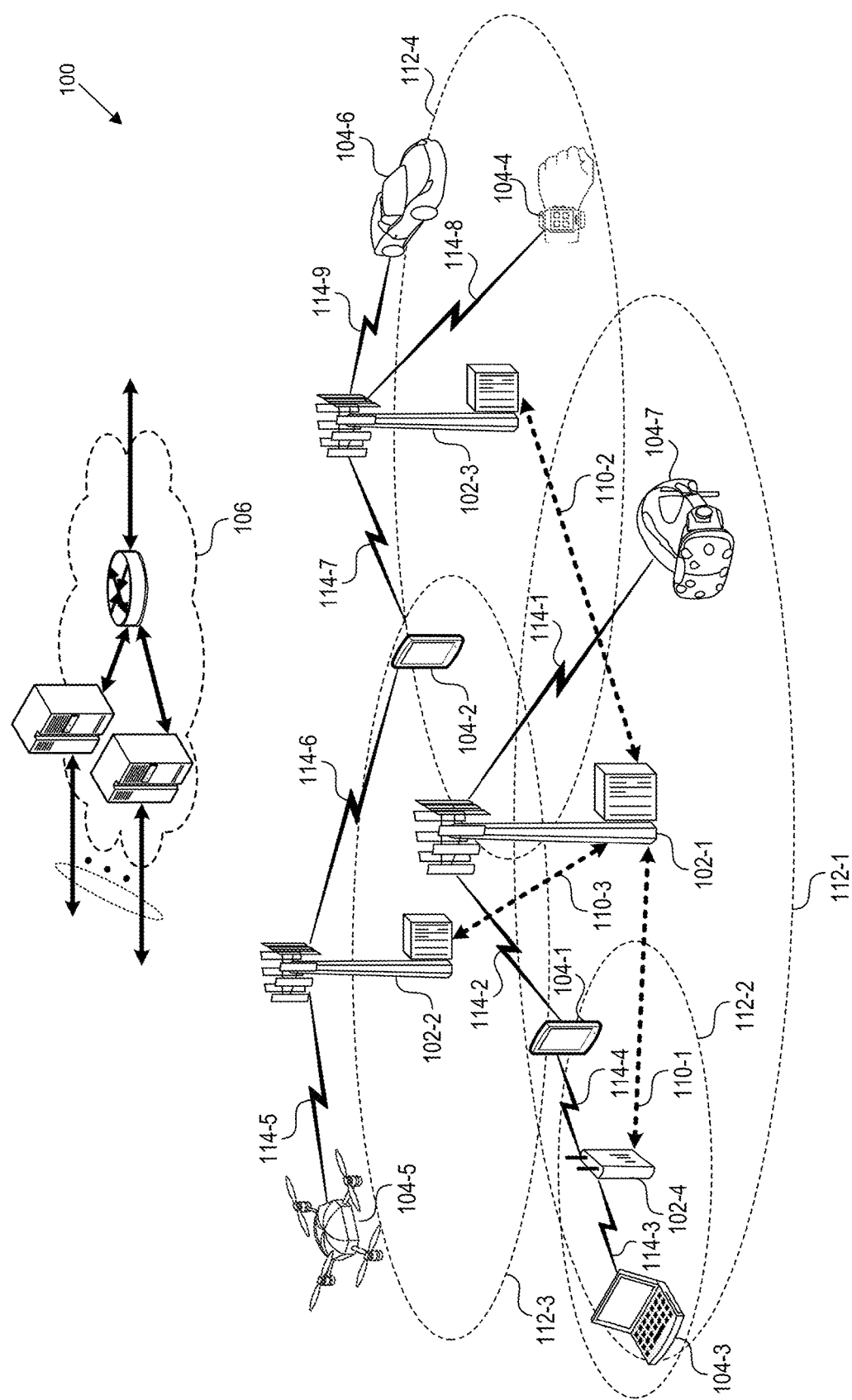
FIG. 1 is a block diagram that illustrates a wireless communications system that can implement aspects of the present technology in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Organizations and/or entities, such as telecommunications service providers, face difficult technical challenges related to monitoring usage of software applications, networks, and/or other resources or services, such as for detecting anomalies in usage data. For example, a telecommunications service provider can monitor usage of one or more telecommunications software applications or services, such as mobile applications, web applications, or websites, to detect whether usage is within a normal or expected range. Detection of one or more anomalies in usage can be indicative of an adverse event, such as a hack or attack, an outage or failure, a fraudulent user, and so forth. However, existing technologies for anomaly detection, such as threshold-based systems, cannot adequately distinguish ordinary user behaviors from true anomalies, which can cause "false positives" (i.e., alleged anomalies that do not correspond to an adverse event) and/or fail to detect adverse events.

For example, existing technologies are inaccurate because usage patterns are often cyclical and/or otherwise irregular, which causes difficulties when defining thresholds for detecting usage anomalies. In other words, ordinary usage is often non-linear with increases and/or decreases in activity that are not indicative of an adverse event. Therefore, detecting anomalies only based on thresholds (e.g., sudden increases or decreases in usage) can be ineffective. Application or service usage occurs in one or more sessions during which a user conducts interactions with the application or service via a user device. Interactions conducted during a session can include one or more transactions (e.g., buying a mobile phone or other device, adding a line of service, paying a bill, etc.), accessing and/or changing user data (e.g., profile information, contact information, plan information, etc.), and so forth. These interactions can be monitored to detect anomalies. For example, an anomaly can be detected based on a sudden increase or decrease in usage (e.g., based on data thresholds, number of active users, number of transactions). However, after a user terminates a session, the user becomes inactive on the application or service until the user initiates a new session. Thus, usage associated with the user can vary widely over time based on frequency and duration of sessions, number of interactions performed in each session, and so forth. Additionally, usage patterns across multiple users can vary widely over time, for example, based on the time of day, the day of the week or year, proximity to holidays, and/or other factors. This kind of cyclical and/or irregular usage can cause inaccuracies in anomaly detection using existing systems, for example, because ordinary changes in user behaviors can exceed usage thresholds that are used to detect anomalies, which can result in false positives. In other words, because usage is noncontiguous (e.g., occurring in multiple discrete sessions) and/or cyclical, existing systems can incorrectly flag ordinary interactions as usage anomalies due to sudden increases or decreases in usage interactions and/or due to other shortcomings of existing technologies, such as threshold-based technologies. Additionally, because user behavior tends to be cyclical and/or irregular, threshold-based systems can be inherently inaccurate, which can result in a failure to identify anomalies when an adverse event occurs.

Accordingly, there is a need for a solution that overcomes the foregoing problems and provides other benefits. For example, there is a need for a solution that modifies usage data to be continuous, such that irregularities and/or cyclical usage patterns are removed or flattened to allow for improved anomaly detection. Usage data can be modified, for example, by providing one or more models to simulate user interactions and/or other attributes when a user is inactive. Thus, there is a need for technologies that modify monitored usage data, such as by simulating a user during times when the user is inactive on an application or service.

Disclosed herein are systems and related methods for detecting usage anomalies using simulated user interactions, such as for detecting anomalies in usage of software applications or services (e.g., mobile or web applications, websites, software applications, and other services or resources) ("system" or "anomaly detection system"). To facilitate anomaly detection, the disclosed system trains a machine learning model to simulate user interactions with a software application or service. For example, a model can be trained to simulate a specific user in a single application or service and/or across multiple applications or services. Usage data is received for multiple sessions during which a user accessed an application or service. The usage data includes at least one interaction that occurred during each session, which can be a transaction or a request. A training dataset is generating using the usage data. Generating the training dataset can include calculating and/or extracting one or more parameter values characterizing a session, such as a session duration, a frequency and/or count of interactions performed during a session, and/or one or more user parameters (e.g., a user location). The generated training dataset is used to train the machine learning model to simulate user interactions with the application or service.

Once trained, the machine learning model can be used to conduct interactions simulating a user during a session with the application or service, such as conducting simulated transactions, updating records, submitting requests, and so forth. The disclosed system receives and monitors usage data for a session between a user device and an application or service to detect usage anomalies indicative of an adverse event (e.g., an outage, an attack, a fraudulent user, etc.). A usage anomaly can be, for example, an abnormal usage pattern, a suspicious transaction or other interaction, and/or an unexpected user device location or device identifier. A user request to terminate the live session is received. In lieu of terminating the session, a handoff is initiated to transfer the session from the user device to a user simulation model. The user simulation model continues the session by conducting interactions to simulate the user. Thus, the disclosed system simulates user interactions with the application or service, such that continuous usage data can be monitored for anomalies. When the user logs in, a handoff is initiated to transfer the session back to the user device. The process of monitoring the session and/or handing off the session between the user device and the user simulation model can be performed perpetually, such that the session is always active and usage data is monitoring in an ongoing and continuous way. Additionally, when user simulation models are deployed across one or more systems (e.g., to simulate substantially all users of an application or service), cyclical usage patterns across all users can be reduced or eliminated, which facilitates detection of system-wide usage anomalies.

Advantages of the disclosed technology include improved ability to detect usage anomalies. Using the disclosed system, usage data can be monitored as a continuous stream, rather than in cyclical and/or irregular usage patterns that are likely to cause "false positives" or other problems. Additionally, the disclosed system can be deployed across all or substantially all users of an application or service to reduce or eliminate cycles, spikes, and/or drops in usage due to ordinary user behaviors. Thus, true usage anomalies corresponding to adverse events can be detected in a more reliable way because spikes and/or other irregularities in ordinary user behaviors are reduced or removed, which increases the likelihood that any observed irregularities are indicative of adverse events.

Although examples are described herein related to anomaly detection for a telecommunications network and/or associated applications or services, a person skilled in the art will appreciate that the disclosed technology can be used in any context where applications or services (e.g., software services, web services, web sites, etc.) and/or network traffic are monitored to detect anomalies and/or associated adverse events. Additionally, the disclosed technology can be used in any context where it is desirable to simulate actions of a user.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Telecommunications Network Anomaly Detection System

Figure 2:
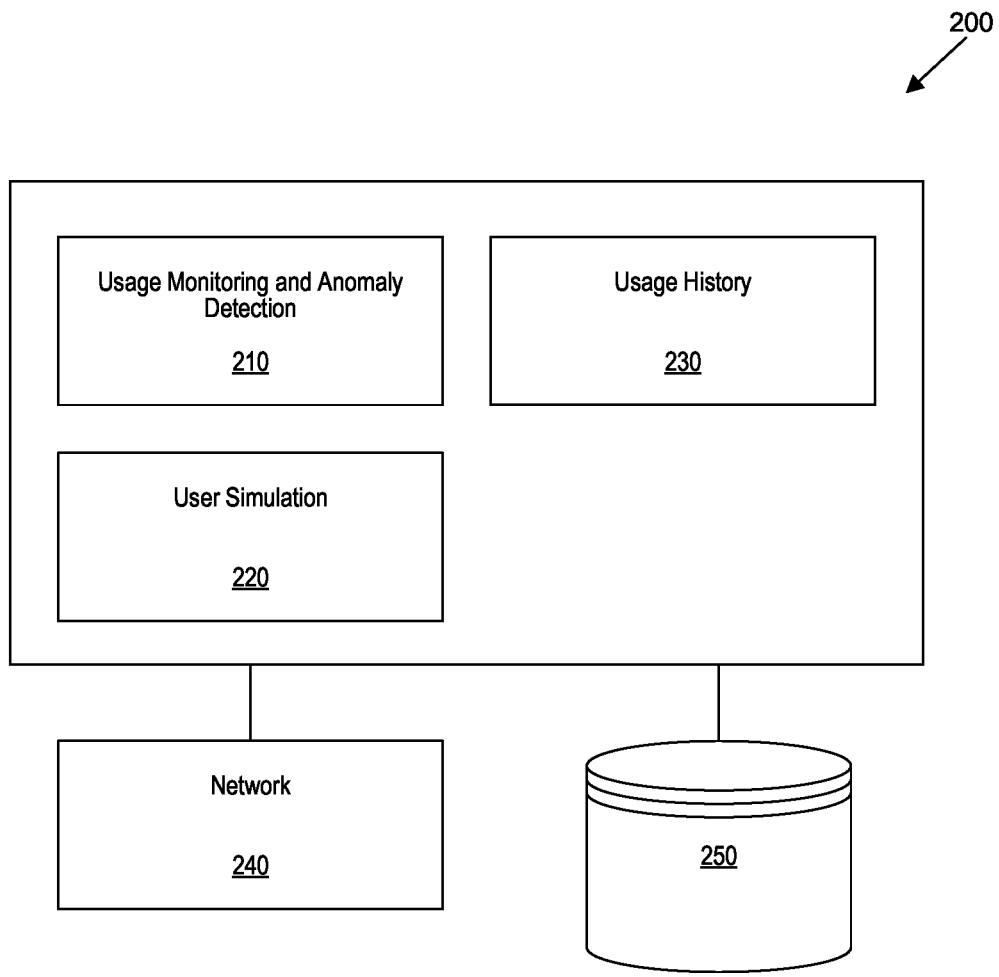
FIG. 2 is a block diagram that illustrates components of an anomaly detection system in some implementations.

FIG. 2 is a block diagram that illustrates components of an anomaly detection system 200 that monitors usage data and/or trains one or more machine learning models to simulate user interactions with an application or service, in some implementations. At least a portion of the system 200 can be provided by a telecommunications service provider, such as a telecommunications service provider that provides the network 100. The system 200 or portions thereof can be provided using one or more components of a telecommunications network, such as the network 100. The anomaly detection system 200 can include functional modules that are implemented with a combination of software (e.g., executable instructions or computer code) and/or hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The anomaly detection system 200 includes a usage monitoring and anomaly detection module 210, a user simulation module 220, and/or a usage history module 230, each of which are discussed separately below. These and other modules of the system access data, such as usage data, user or device data, and/or training datasets, via a network component 240 and/or a storage component 250. The network component 240 is configured to communicate with external devices or entities, such as user devices, applications or services, and/or components of a telecommunications network. The storage component 250 comprises local storage, storage on a server system or on the cloud, or a combination thereof. The storage component 250 stores data for or used by the system 200, such as usage data, user or device data, and/or training datasets used by the system 200.

Usage Monitoring and Anomaly Detection Module

The usage monitoring and anomaly detection module 210 receives/accesses and/or monitors usage data for software applications or services to detect usage anomalies indicative of adverse events. The applications or services can be, for example, telecommunications software applications or services, such as websites, mobile and/or web applications, subscriber portals, and so forth. Usage data from applications or services can be received or accessed in various ways. For example, usage data can be streamed and/or received in real time or near-real time (e.g., as a session is ongoing). Additionally or alternatively, usage data can be received in batches and/or at regular or irregular intervals (e.g., hourly, daily, weekly). The usage data can be for a specific user and/or for multiple users.

The monitoring and anomaly detection module 210 analyzes the usage data to detect usage anomalies, such as unusual usage patterns, interactions, attributes, and so forth. The below Table 1 provides non-limiting examples of usage anomalies, which can be indicative of corresponding adverse events.

| Usage Anomaly | Description | Corresponding Adverse Event |
| --- | --- | --- |
| Spike in activity or interactions | Unusual increase in interactions or other activities in a given time period, such as a number of logins, transactions, requests, or other interactions during a time period (e.g., per minute, per our). | Likely fraudulent or malicious user or bot has accessed user account |
| Unexpected user device and/or device location | Location or other attribute associated with a user device is unexpected (e.g., differs from a location or device from which user typically accesses application or service). | Possible fraudulent or malicious user |
| Sudden decrease in activity or interactions | Usage stops or decreases unexpectedly. | Possible outage, failure, or slowdown of application or service |

Detecting anomalies in usage data can include calculating one or more confidence scores indicating a likelihood that usage data indicates an adverse event and detecting an anomaly when a confidence score exceeds a threshold value. For example, one or more confidence scores can be calculated based on usage data for a single anomaly and/or multiple anomalies. A confidence score can be based on various variable values, such as variables associated with a number of transactions or interactions, requests, one or more velocities (e.g., transactions/interactions per minute or hour), and/or one or more static parameters (e.g., device identifiers, user locations, IP addresses, user identifiers).

When the system detects an anomaly, the system can trigger and/or perform one or more actions, such as recommending actions to correct or prevent an adverse event, generating a notification or message, terminating access to an application or service, and so forth. For example, an application or service can be temporarily deactivated to prevent unauthorized use and/or failure of the application or service. Additionally or alternatively, one or more users can be prevented from accessing an application or service. In some implementations, the system provides alerts and/or notifications, such as related to identifying anomalies and/or adverse events, recommending actions to remedy adverse events, and so forth.

User Simulation Module

The user simulation module 220 trains and/or provides one or more machine learning models to simulate interactions and/or other attributes of a user in a session with an application or service. For example, a machine learning model (e.g., a user simulation model) trained by the user simulation module 220 can simulate interactions and/or other attributes of an ordinary user who uses an application or service within expected usage ranges, such as usage that does not include any usage anomalies. A machine learning model can use, comprise, and/or be included in a software agent that is capable of autonomously and/or semi-autonomously interacting with the application or service. The machine learning model can simulate various attributes of a user, such as device attributes (e.g., device identifier, device location, etc.) and/or user attributes (e.g., user name or other identifier, etc.). Additionally, the machine learning model can conduct various interactions during sessions with applications or services, such as conducting real or simulated transactions, submitting requests, accessing data, and so forth. In other words, models trained and/or provided by the user simulation module 220 can appear to be real users interacting with an application or service by performing interactions that simulate a real user and/or simulating attributes of a user and/or a user device. To simulate a user, the user simulation module 220 can provide and/or use one or more virtual bots or agents, which can comprise machine learning models and/or be coupled with machine learning models.

In some implementations, the user simulation module 220 can detect that a user whose usage is being monitored by the system 200 has requested to and/or attempted to terminate a session with an application or service. In response to detecting the attempt to terminate the session, the user simulation module 220 instead triggers a handoff procedure by which the session is transferred to a machine learning model provided by the user simulation module 220, which continues the session by simulating interactions and/or attributes of the user. When the user next logs into the application or service, the user simulation module 220 can then trigger a handoff procedure by which the session is transferred back to the user device. Operations for handing off the session can be performed repeatedly, such that the session is perpetually active and usage data is generated and monitored on a continuous and/or substantially continuous basis.

In some implementations, the user simulation module 220 generates and/or accesses one or more training datasets that are used to train one or more machine learning models to simulate interactions and/or attributes of a user. The training datasets are generated using usage data for multiple sessions during which users conducted interactions with the application or service. The usage data can be associated with a particular user (e.g., to train a model to simulate a specific user) and/or with a particular user type (e.g., an ordinary user conducting usage within expected usage ranges). The usage data can include, for at least a portion of sessions, one or more interactions conducted between the user and the application or service, such as a transaction or request. Additionally, the usage data can include one or more attributes associated with a user and/or a user device, such as a device or user identifier, a device or user location, and so forth.

Generating a training dataset can include performing processing and/or pre-processing of usage data, such as calculating or extracting values for one or more parameters characterizing sessions, user interactions, and so forth. For example, parameters can relate to frequencies and/or counts of interactions, static attributes (e.g., user device location and/or identifier), and so forth.

A "model," as used herein, can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the user simulation module 220 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer") one or more nodes can produce a value classifying the input that, once the model is trained, can be used to make one more predictions and/or take other actions. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to simulate user interactions.

Usage History Module

The usage history module 230 stores/maintains/accesses historic data, such as data related to users and/or data related to applications or services. Data stored by the usage history module 230 can be used, for example, to generate training datasets and/or testing datasets, to evaluate trained machine learning models, and/or to track and manage users, applications, services, and so forth.

In some implementations, the system 200 can be used to monitor and simulate usage of specific users, and the usage history module 230 can, thus, maintain a profile comprising usage data and/or other data associated with each specific user. This data can be used to train machine learning models to simulate specific users when using one or more applications or services.

In some implementations, the usage history module 230 can maintain data associated with certain applications or services, for example, to determine and/or calculate typical ranges for ordinary usage of each application or service.

Training a Machine Learning Model

Figure 3:
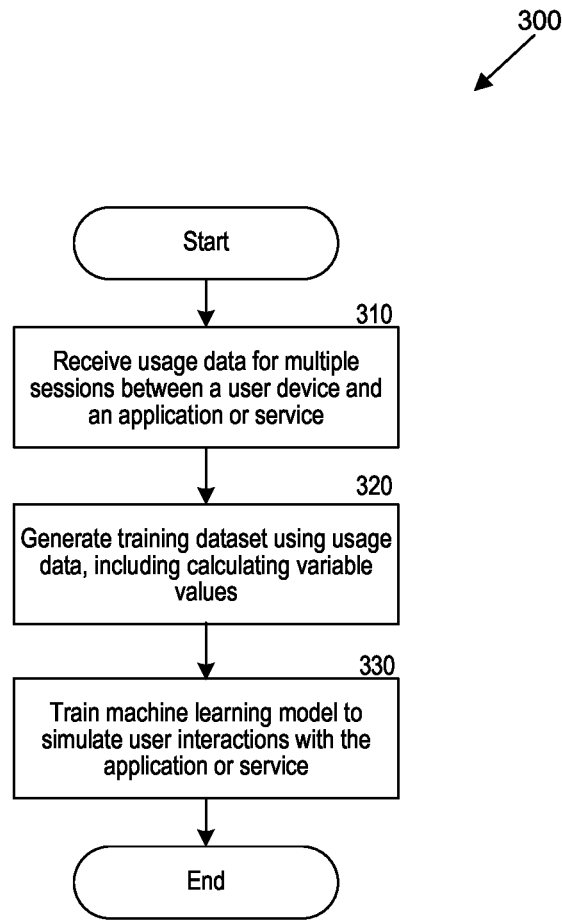
FIG. 3 is a flow diagram that illustrates a process to train a machine learning model to simulate user interactions in some implementations

FIG. 3 is a flow diagram that illustrates a process 300 to train one or more machine learning models to simulate user interactions with an application or service in some implementations. The process 300 can be performed by or using at least a portion of the system 200 of FIG. 2, such as the user simulation module 220. The one or more machine learning models trained using the process 300 can comprise and/or use a virtual bot or agent that can simulate actions of a user during a session with an application or service.

The process 300 begins at block 310, where usage data is received for multiple sessions during which a user interacted with an application or service using a user device. For at least a portion of the sessions, the usage data can include one or more interactions conducted during the session, such as transactions, requests, profile changes, and so forth. Additionally, the usage data can include one or more attributes associated with a user and/or a user device in the session, such as a user or device identifier, a user or device location, and so forth.

The process 300 proceeds to block 320, where a training dataset is generated using the usage data received at block 310. Generating a training dataset can include, for example, calculating and/or extracting one or more parameter values characterizing sessions, users, and/or application or service usage. Parameter values can relate to frequencies and/or counts, such as a number of transactions or other interactions conducted in a time period (e.g., total transactions per hour, financial transactions per hour, purchases per day, etc.). Additionally or alternatively, parameter values can relate to user and/or device attributes, such as a location or identifier.

The process 300 proceeds to block 330, where the generated training dataset is used to train a machine learning model to simulate user interactions with the application or service. The trained model can then be applied in sessions with the application or service, and the interactions can be monitored as described herein to detect usage anomalies.

In some implementations, the process 300 includes evaluating the trained machine learning model, such as using a test dataset. For example, the trained machine learning model can be applied in sessions with an application or service, and usage data for the sessions can be monitored to detect various attributes of the sessions, such as a number of anomalies and/or a number or type of interactions. Results of the monitoring can then be compared to one or more control datasets, such as a testing dataset (e.g., based on a portion of the training dataset generated at block 320 held back for testing). In some implementations, the trained machine learning model is evaluated periodically (e.g., daily, weekly, monthly, quarterly, yearly, etc.) and/or as needed to determine whether the accuracy of the model exceeds a threshold accuracy (e.g., 80%, 90%, 95%, etc.).

If the accuracy of the model does not exceed the threshold accuracy then the model can be retrained. Retraining the machine learning model can include training the machine learning model at least a second time using the same training dataset, training the machine learning model with a different (e.g., expanded) training dataset, applying different weightings to a training dataset, rebalancing a training dataset, and so forth. Through retraining, the model can be made more accurate, such as to correct for variances between expected outcomes and actual outcomes (e.g., expected number of usage anomalies) and/or to correct for model drift (e.g., degradation in model performance over time due to a change in environment, data patterns, assumptions underlying a model, etc.). Various techniques can be used to train and/or retrain the machine learning model. For example, adaptive boosting can be used, which is an iterative process that runs multiple tests on a collection of training data. Adaptive boosting transforms a weak learning algorithm (e.g., an algorithm that performs at a level only slightly better than chance) into a strong learning algorithm (an algorithm that displays a low error rate, e.g., below a threshold error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting can use, for example, weak classifiers that are single-split trees with only two leaf nodes.

Although depicted as a discrete process, the process 300 and/or portions thereof can be repeated, for example, such that the machine learning model is trained on an ongoing and/or continuous basis as new usage data is received.

Monitoring Usage to Detect Anomalies

Figure 4:
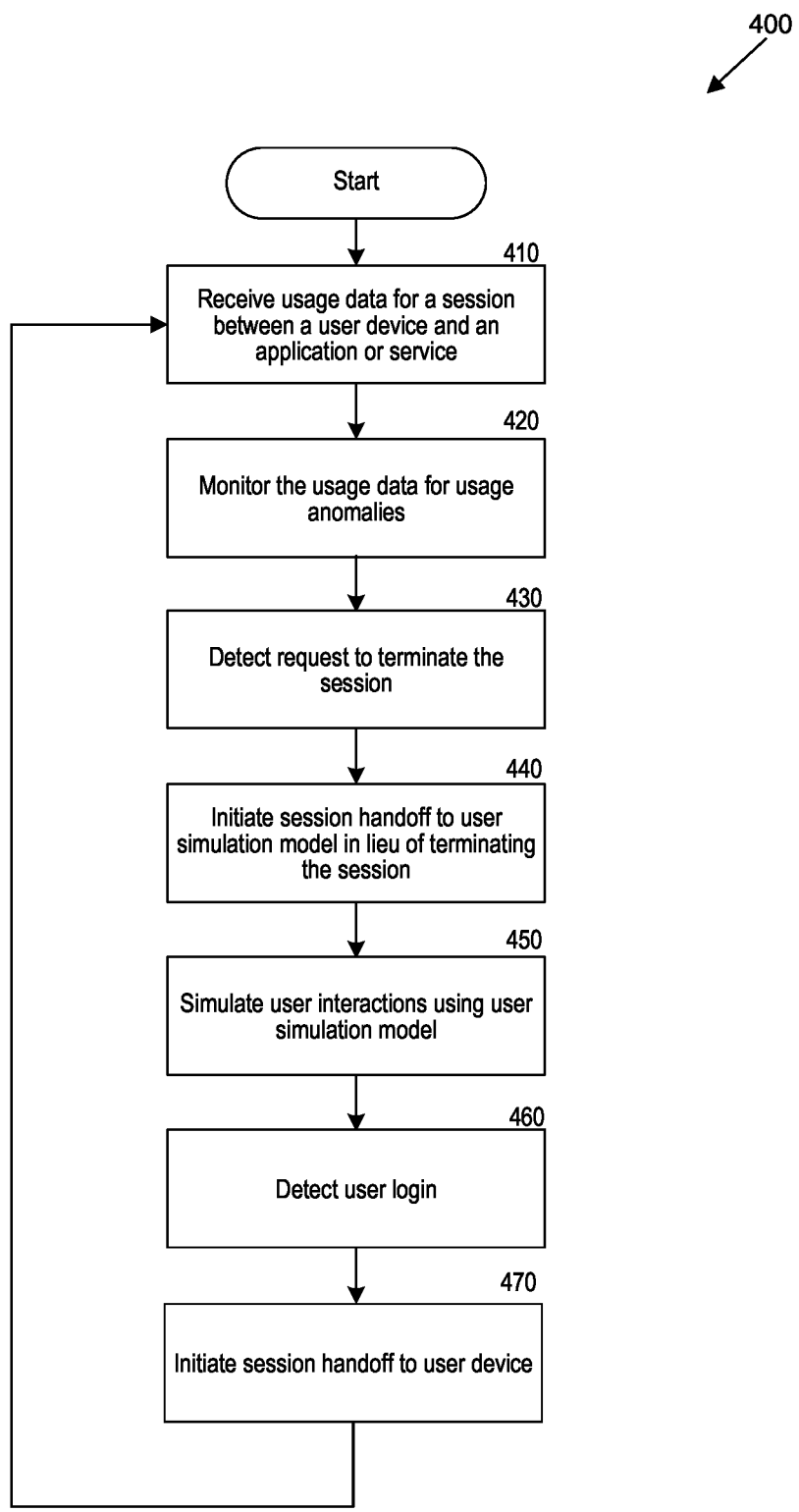
FIG. 4 is a flow diagram that illustrates a process to detect anomalies in usage data using a trained machine learning model in some implementations.

FIG. 4 is a flow diagram that illustrates a process 400 to monitor usage data and detect anomalies, including use of a user simulation model, in some implementations. The process 400 can be performed, at least in part, by the system 200 of FIG. 2, such as using the usage monitoring and anomaly detection module 210 and/or the user simulation module 220. Additionally, in some implementations, the user simulation model used in the process 400 can be or comprise a machine learning model trained using the process 300 of FIG. 3.

The process 400 begins at block 410, where usage data is received for a session between a user device and an application or service. The user device can be associated with and/or operated by a user, such as a subscriber of a telecommunications network. The usage data can comprise interactions conducted between the user device and the application or service. The session can be, for example, a live session.

The process 400 proceeds to block 420, where the received usage data is monitored to detect the presence of usage anomalies indicative of a likely adverse event, as described herein.

The process 400 proceeds to block 430, where a request to terminate the session is received and/or detected. Detecting the request can include, for example, detecting that a user has logged out of an application or service, detecting that a user has closed an application, detecting that a user has navigated away from a website, detecting inactivity for a certain time period, and so forth.

In lieu of terminating the session in response to detecting the request, the process 400 proceeds to block 440, where the session is instead transferred to a user simulation model to continue conducting the session. The user simulation model can be, for example, a trained machine learning model.

After the session has been handed off to the user simulation model, the process 400 proceeds to block 450, where the user simulation model continues the session by simulating interactions of the user and/or attributes of the user.

When the user next logs into the application or service, the process 400 proceeds to block 460 where the user login is detected.

In response to detecting the user login, the process 400 proceeds to block 470, where the session is transferred to the user device to continue the session, and at least a portion of the process 400 repeats, for example, by proceeding to block 410 and/or block 420 to continue receiving and monitoring usage data.

The process 400 can then repeat any number of times, for example, such that the session is substantially perpetual and/or ongoing, thereby eliminating cyclical and/or irregular usage patterns of ordinary users and allowing the disclosed system to monitor a continuous stream of usage data to detect usage anomalies.

The process 400 can be performed in various orders, including performing one or more operations in parallel. For example, receiving and monitoring the usage data for usage anomalies at blocks 410 and 420 can be performed in parallel with at least a portion of the other operations of the process 400, such that the system continually monitors the usage data regardless of whether the user or the user simulation model is conducting the session.

Computing System

Figure 5:
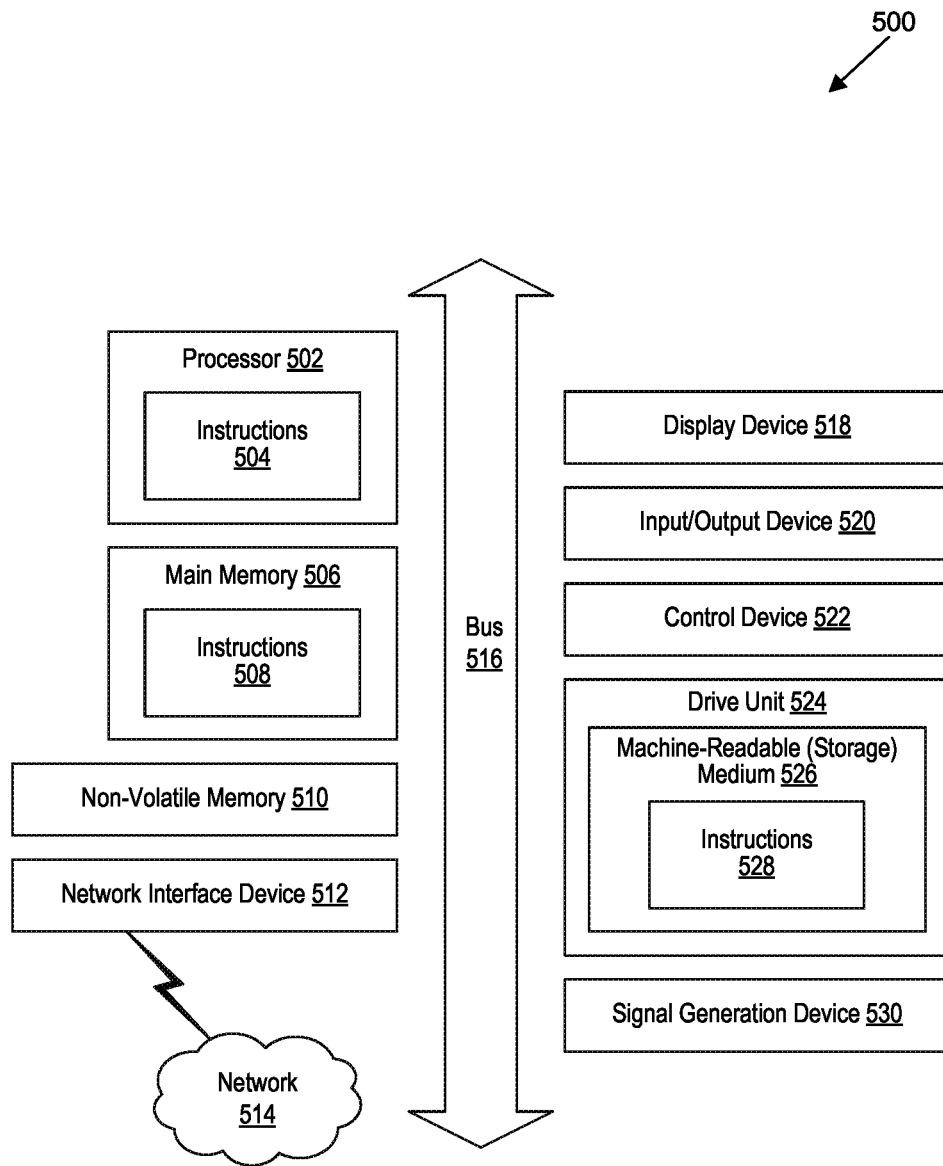
FIG. 5 is a block diagram that illustrates an example of a computing system in which at least some operations described herein can be implemented.

FIG. 5 is a block diagram that illustrates an example of a computing system 500 in which at least some operations described herein can be implemented. As shown, the computing system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable medium, excluding transitory signals, carrying instructions that, when executed by a computing system, cause the computing system to perform operations to detect usage anomalies in usage data for a telecommunications software application or service, the operations comprising:
receiving usage data for a session between a user device and the telecommunications software application or service;
monitoring the usage data to detect the usage anomaly, wherein the usage anomaly includes at least one of an abnormal usage pattern, a suspicious transaction, or an unexpected user device location;
detecting a request to terminate the session; and
in lieu of terminating the session, initiating a handoff to transfer the session from the user device to a user simulation model that simulates interactions of a user associated with the user device.

2. The at least one computer-readable medium of claim 1, wherein the operations further comprise:
detecting the usage anomaly; and
performing at least one action in response to detecting the usage anomaly, the at least one action including generating a notification of the usage anomaly, terminating the session, or both.

3. The at least one computer-readable medium of claim 1:
wherein the session is a live session, and
wherein the usage anomaly includes at least one of a frequency or count of interactions or a device identifier.

4. The at least one computer-readable medium of claim 1, wherein the user simulation model includes a machine learning model trained, using a training dataset, to simulate behavior of the user.

5. The at least one computer-readable medium of claim 1, wherein the telecommunications software application or service is a web service, a mobile application, or a website.

6. The at least one computer-readable medium of claim 1, wherein the operations further comprise:
detecting a new login by the user; and
initiating a handoff to transfer the session from the user simulation model to the user device.

7. The at least one computer-readable medium of claim 1, wherein detecting the usage anomaly includes calculating a confidence score indicating a likelihood that the usage data is associated with a fraudulent user.

8. The at least one computer-readable medium of claim 1, wherein detecting the usage anomaly includes identifying a cyberattack.

* * * * *